United States Patent
Rutten

[11] 3,853,622
[45] Dec. 10, 1974

[54] STERILIZER FOR RUBBER PARTS
[75] Inventor: Werner Rutten, Erkrath, Germany
[73] Assignee: Anton Huber GmbH & Co. KG, Freising, Germany
[22] Filed: May 19, 1972
[21] Appl. No.: 255,089

[30] Foreign Application Priority Data
May 19, 1971 Germany.......................... 2125102

[52] U.S. Cl................... 134/25 R, 21/56, 21/94, 34/58, 34/133, 134/33, 134/153, 134/157
[51] Int. Cl.......... B08b 3/06, B67c 1/00, A61l 1/00
[58] Field of Search............ 134/25 R, 33, 117, 157, 134/153; 21/94, 98, 56; 34/58

[56] References Cited
UNITED STATES PATENTS

| | | | |
|---|---|---|---|
| 1,234,498 | 7/1917 | Seymour, Jr. | 34/58 UX |
| 1,284,931 | 11/1918 | Rouston | 34/58 X |
| 1,448,431 | 3/1923 | Castruccio | 134/25 R |
| 1,717,179 | 6/1929 | Altorfer | 34/58 |
| 2,652,182 | 9/1953 | Umbdenstock | 21/56 |
| 3,425,135 | 2/1969 | Langsetmo et al. | 34/58 X |
| 3,456,659 | 7/1969 | Tiby | 134/153 |

Primary Examiner—Morris O. Wolk
Assistant Examiner—Arnold Turk
Attorney, Agent, or Firm—Edwin E. Greigg

[57] ABSTRACT

Sterilizer for rubber parts which operates without causing fretting of the rubber parts and ensures that the parts are free of loose particles or other foreign bodies. The sterilizer comprises a sterilization drum serving for receiving the rubber parts, which is arranged in an outer container which can be closed and is mounted for rotary movement by means of a shaft which passes through a passage out of the outer container, and a drive unit connected with the shaft. The operational speed range of the drive unit provides for at least one speed of rotation which is so high that the articles contained in the sterilizing drum are held by centrifugal force against the inner wall of the drum. The outer container and the passage for the drum shaft are adapted to resist a gauge pressure.

13 Claims, 3 Drawing Figures

STERILIZER FOR RUBBER PARTS

BACKGROUND OF INVENTION

1. Field to which invention relates

The present invention relates to a sterilizer for rubber parts, and more particularly to such a sterilizer for rubber parts intended for the pharmaceutical industry and are free of adhering foreign bodies such as loose rubber particles, comprisisng a sterilizing drum serving for receiving the rubber parts, which is arranged in an outer container which can be closed and is mounted for rotary movement by means of a shaft which passes through a passage out of the outer container, and a drive unit connected with the shaft.

2. The prior art

The pharmaceutical industry requires rubber parts which are both sterile and also completely free of adhering foreign bodies. An example of such rubber parts is constituted by plugs and caps for bottles, which contain liquids for injection and from which the liquid is removed for use by means of injection syringe, whose needle is stabbed through the plug or closure closing the bottle.

The production of such sterile rubber parts free from foreign bodies has in the past been extremely difficult. Thus, to date it has hardly been possible to ensure that the rubber parts do not rub together during their treatment so that small particles are rubbed off. The small particles thus produced by the rubbing or fretting and other foreign bodies naturally constitute a substantial danger for the patient, especially if such particles should be injected intravenously with the liquid.

A device for cleaning rubber plugs and the like for the pharmaceutical industry has been proposed, which comprises a perforated drum arranged in an outer container which can be closed and plates extend into the interior of the drum in order during washing, drying, and sterilizing to carry the rubber plugs and to tumble them. During washing and rinsing the drum runs at 5 rpm. and on treatment with silicone at 26 rpm. and during sterilizing, lasting about an hour during which steam at atmospheric pressure is passed through, the speed is 5 rpm. Finally, on vacuum drying and final drying with sterile air at 80°C the speed of rotation is again 5 rpm. The interior drum is mounted on a shaft which is hollow and passes through the wall of the external container. Through the shaft washing liquid and the steam necessary for sterilizing are fed in. The external container has at the top a supply line, which can be closed by means of a valve, for a siliconizing liquid and at the bottom there is a funnel-shaped outlet, which is connected via a valve with a waste duct.

With such an apparatus it is not possible to produce rubber parts which are free of foreign bodies, and more particularly free of rubber particles produced by fretting, since the rubber parts are constantly in movement in the slowly rotating drum and thus rub against one another. Furthermore, the prior art device does not allow of sterilization at a gauge pressure, as is required in many cases. Therefore, previously rubber parts which were to be free from adhering foreign bodies were placed after washing on trays carefully and the trays were then pushed into a sterilizing chest or cabinet for sterilizing. This method is not only very tedious but also involves the danger that during placing on the trays and transport from the washing plant to the sterilizing chest the parts may be contaminated again unintentionally.

SUMMARY OF INVENTION

Accordingly one object of the present invention is to provide a sterilizer for rubber parts which are completely free of adhering foreign bodies such as particles produced by fretting, in which the rubber parts to be cleaned are treated very carefully so that practically no fretting can occur.

In accordance with the invention in order to achieve this aim a sterilizer of the above-described type is characterized by the combination of the following features:

a. the operational speed of rotational range of the drive device provides for at least one speed of rotation which is so high that the articles contained in the sterilizing drum are held by centrifugal force against the inner wall of the drum, and b. the external container and the passage for the drum shaft are adapted to resist a gauge pressure.

The present sterilizer is preferably so operated that the speed of rotation of the drum after the drawing off of the liquid necessary for washing and rinsing respectively is so increased that the rubber parts distribute themselves on the inner wall and are held on it by centrifugal force and that the speed of rotation of the drum which ensures that the rubber parts are held is maintained also during sterilizing and drying until the end of the drying operation without any interruption.

Further developments and forms of the invention are defined in the subclaims.

In what follows embodiments of the invention are described in more detail with reference to the drawings.

LIST OF SEVERAL VIEWS OF DRAWINGS

DESCRIPTION OF PREFERRED EMBODIMENTS

Figure 1:
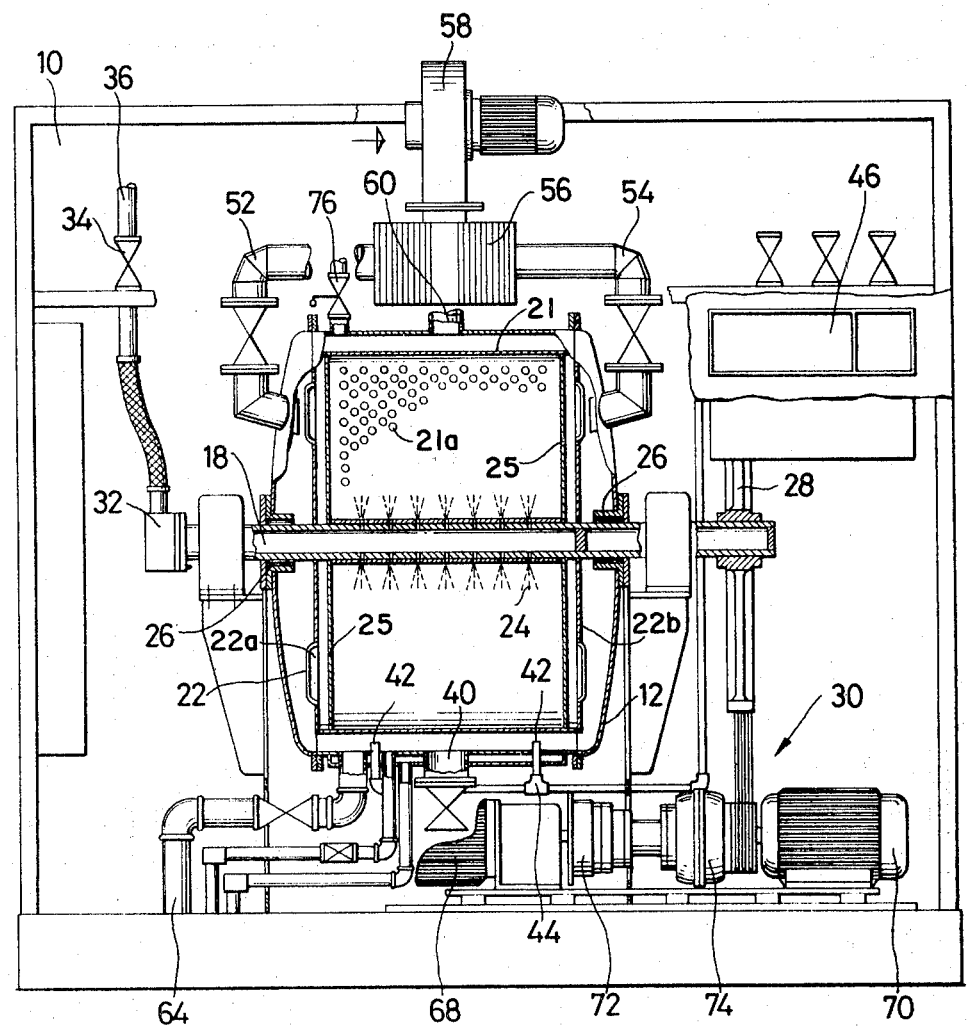
FIG. 1 shows a side view and partial section of a sterilizer in accordance with one embodiment of the invention.
Figure 2:
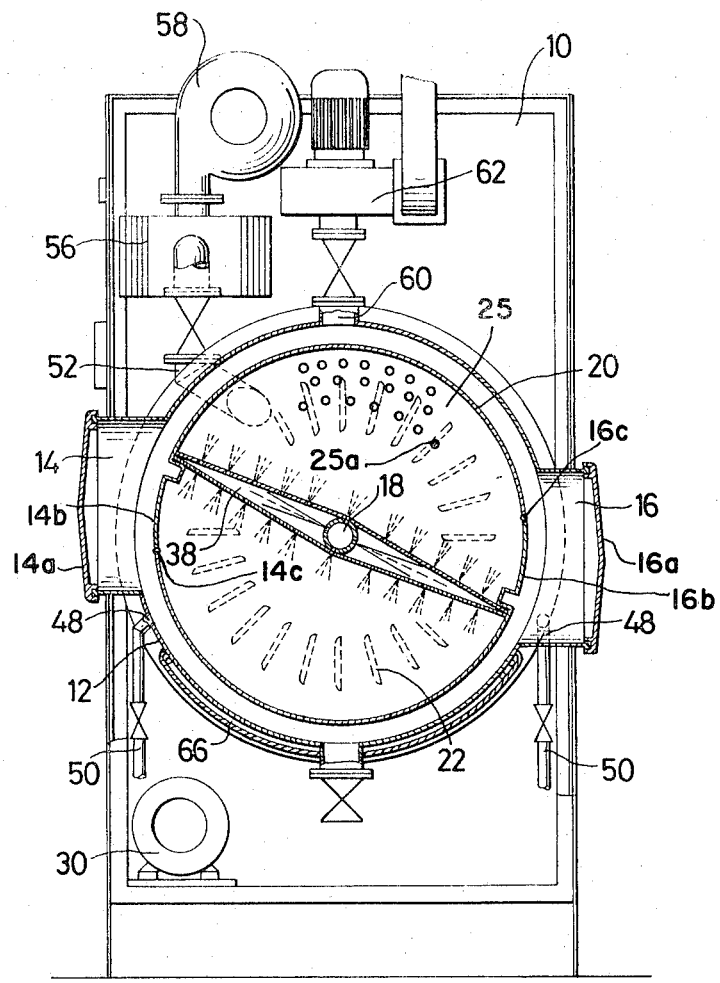
FIG. 2 shows a section of the sterilizer in accordance with FIG. 1.

The sterilizer 10 shown in FIGS. 1 and 2 comprises a pressure resistant outer container 12, to whose interior access can be obtained through a charging opening 14 which can be closed in a pressure-tight manner by door 14a and a discharge opening 16 which can be closed in a pressure-tight manner also by door 16a, on the opposite side. In the outer container on a hollow shaft or trunnion 18 an inner drum 20 is journalled. The inner drum has a charging door 14b pivoted on a hinge 14c, a discharge door 16b pivoted on hinge 16c and its side walls 22b have vane blades 22 formed from the walls leaving openings 22a. The cylindrical wall 21 of the inner drum is foraminous, having a multitude of small openings 21a over its whole area. The inner drum also has foraminous inner walls 25 spaced from the walls 22b, the walls 25 having a multitude of small openings 25a over their areas.

The hollow shaft 18 has openings 24 in the interior of the drum 20, which serve as spraying nozzles and steam inlet openings. It passes through shaft seals 26 in a pressure-tight manner through the end wall of the outer container and at one end is provided with a V-belt pulley 28, which is driven via a V-belt from a drive unit 30. On the other end of the shaft 18 there is a connection pot 32 which is connected via a valve 34 with a steam supply duct or line 36.

The interior of the inner drum 20 is divided up by a diametrally extending partition 38 into two halves. As shown the partition can be a hollow body and have spraying nozzles, which are supplied via the hollow shaft 18.

On the bottom of the external container there opens an emptying connection 40, which is connected via a valve or cock with a waste duct. Furthermore, at the bottom of the external container 12 spraying nozzle-like distributing tubes 42 are provided which are fed via a supply line 44. Washing liquid from these tubes enters the inner container or drum 20 by way of the openings 21a, 22a and 25a. The supply line 44 is connected with a feeding arrangement 46 which in a conventional manner can comprise supply containers for washing, rinsing, and treating agents (in the latter case silicones).

Somewhat below the level of the shaft 18 draw off openings 48 are provided on both sides of the external container which are connected with draw off ducts comprising valves.

In the upper part of the external container there open two air ducts 52, 54, which each comprise a cock and are connected via a sterilizing filter 56 with an air supply blower 58. At the top the outer container is provided with an air draw off opening 60, which is connected via a cock or valve with a draw off blower 62. At the bottom the outer container 12 can be provided with a line or duct 64 for removing air.

The lower part of the outer container 12 is provided with a heating casing 66, which is supplied with high pressure super-heated steam. This brings about a rapid and efficacious heating without it being necessary to employ heating coils or the like in the interior of the external container. Such heating coils would impede cleaning.

The drive unit comprises two drive motors 68, 70 and an electromagnetic clutch 72 and a steplessly variable liquid drive 74. The one motor 68 is in operation during the washing and rinsing operations and can drive the inner drum with a reversing action, that is to say with so many revolutions in one direction followed by so many revolutions in the opposite direction. During sterilizing and drying the second motor 70 is switched on, which drives in this case the inner drum with a relatively high speed of rotation, for example 300 rpm.

The machine furthermore comprises monitoring instruments, not shown, and a control device, which can carry out a controlling function for example in accordance with an automatic program, which can be selected by program cards.

The device described operates in the following manner.

The rubber parts and the like to be cleaned are charged through the charging opening 14 and the door 14b on the "dirty" side of the machine (on the left in terms of FIG. 2) and the external container is then closed. Following this washing liquid is fed in through the distribution tubes 42 from below and is heated as desired by the heating casing 66. The washing liquid then flows away again through the outlet openings 48 and draw off ducts 50 or is drawn off by suction. Owing to this so-called clean current or flow principle a rapid removal of suspended particles by swilling is achieved. The paddles or blades 22 arranged on the end faces of the interior drum bring about an intensive sweeping of liquid through the articles or parts to be washed.

The diametral partition 38 gently lifts the parts to be washed out of the washing liquid and then allows them to slide back into the liquid. The movement of the rubber parts thus takes place mainly in the washing liquid. This avoids fretting of the parts to be washed and furthermore achieves a rapid washing process of short duration.

Following the washing operation one or more rinsing operations can be carried out, either discontinuously or continuously. If the treatment is to include siliconizing of the parts to be washed, this siliconizing is carried out following the last rinsing bath with a treatment liquid to which silicone has been added.

After the external container 12 has been emptied, the speed of rotation of the inner drum is gradually increased by means of an hydraulic stepless drive 74 so that the parts to be washed, for example the rubber plugs, become evenly distributed on the inner wall of the inner drum and are held there by centrifugal force. The speed of rotation of the drum can in the case of a diameter of the inner drum 12 of approximately 750 to 1,000 mm amount to approximately 200 to 400 rpm., 300 rpm. being preferred.

During this time the rubber plugs are completely "at rest" and there is therefore no fretting.

For sterilizing the rubber plugs super-heated steam with the pressure of approximately 3 atmospheres gauge is introduced into the inner container via the line 36 and the hollow shaft 18. The steam in the inner container, of course, can escape through openings 21a, 22a and 25a into the outer container but the steam in the inner container will be at the same pressure as that in the outer container which is automatically held by a gauge pressure valve 76 at the desired value, for example 1.2 atmospheres gauge. The steam temperature can amount to 121°C for example during sterilizing. The sterilizing operation can last for approximately 30 minutes and is carried out at a gauge pressure in the steam passing through the device. During the whole of the sterilizing operation the inner drum 20 is rotated so rapidly that the rubber plugs rest against the inner drum wall.

After termination of the sterilization the steam supply is automatically switched off and the air charging blower 58 now passes sterile air through the sterilizing filter 56 into the outer container 12, and the air is drawn off by the blades 22 into the inner container and can flow out through the openings 60 and/or 40 in the middle. Owing to the sterile air introduced the rubber plugs are dried and the machine is cooled.

After the drying of the parts the drive is stopped and the cleaned sterilized and dried rubber plugs can be removed on the sterile side of the device (on the right in terms of FIG. 2) through the discharge opening 16.

Figure 3:
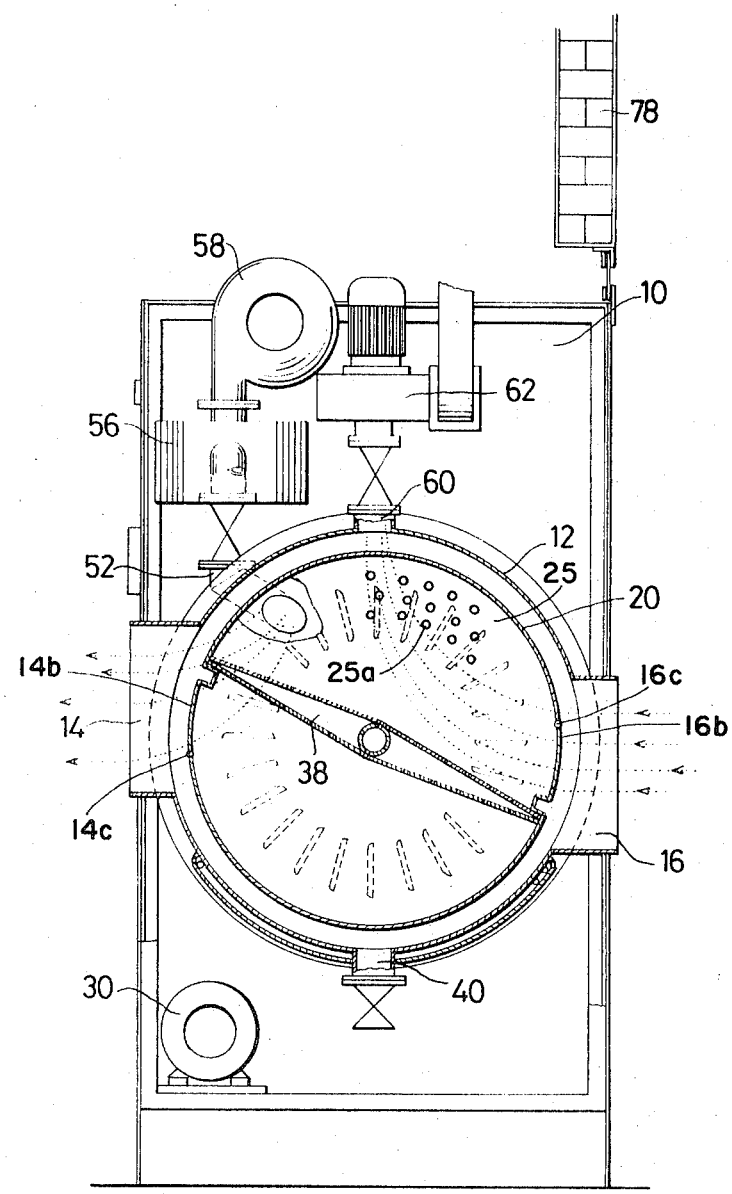
FIG. 3 shows a view, corresponding to FIG. 1, of a sterilizer in accordance with the invention built into a wall.

Preferably the device is so built into a partition 78 (FIG. 3) that the dirty side (on the left) and the sterile side (on the right) are completely separated from each other. In this case on the sterile side a certain gauge pressure should be maintained. On emptying the machine the draw off blower 62 is kept in operation so that sterile air flows through the machine.

On charging the machine the blower 58 can be put into operation so that in the machine a gauge pressure with sterile air is maintained. The air currents during loading and emptying of the machine are denoted in broken lines in FIG. 3. These currents naturally never flow simultaneously. Preferably the closing means of the charging opening 14 and the discharge opening 16 are so connected that simultaneous opening of the two openings 14 and 16 is impossible.

The term rubber parts is to be understood to include parts of natural rubber and synthetic rubber, including elastomeric synthetic resins or plastics materials which have rubber-like properties.

I claim:

1. A sterilizer for obtaining rubber parts for pharmaceutical purposes and the like, which rubber parts are free of fretted portions thereof comprising, in combination:
   a. a sterilizing drum for receiving the rubber parts, said drum having a perforated circumferential wall and a charging door;
   b. a closable outer container, said outer container being provided with at least one charging opening and at least one emptying opening arranged on opposite sides of said outer container, said outer container being adapted to resist pressure differential which may exist between its outer and inner surfaces during operation and said drum being arranged in said outer container;
   c. a shaft which passes through a passage out of said outer container, said drum being mounted on said shaft for rotary movement by said shaft and said passage being adapted to resist pressure differential which may exist between its outer and inner surfaces during operation;
   d. a drive unit, said drive unit being connected to said shaft for rotary driving of said shaft;
   e. operational means for affecting speed of said drive unit to provide at least one speed of rotation which is sufficiently high that rubber parts within said sterilizing drum may be held by centrifugal force against said inner wall of said drum;
   f. a liquid supply line and an outlet line, said supply line and said outlet line being in communication with said outer container; and
   g. means for introducing pressurized steam into said drum.

2. A sterilizer in accordance with claim 1, including means for changing steplessly the speed of rotation of said drive unit.

3. A sterilizer in accordance with claim 1, further comprising at least one outlet opening and wherein said outlet line opens into said at least one outlet opening, which is arranged below the level of said shaft.

4. A sterilizer in accordance with claim 1, further comprising a pressure-tight heating casing having connections for a pressure steam line, wherein the interior of said outer container is substantially smooth and the lower side of said outer container is surrounded by said pressure-tight heating casing.

5. A sterilizer in accordance with claim 1, further comprising a spray nozzle arrangement and wherein said liquid supply line is connected with said spray nozzle arrangement, said spray nozzle arrangement being arranged in said outer container.

6. A sterilizer in accordance with claim 1, wherein said shaft for said drum is a hollow shaft and is provided with openings for introduction of the pressurized steam into the interior of said drum.

7. A sterilizer in accordance with claim 1, including a perforated wall radial to a shaft, said perforated wall being inward of a vaned wall on said shaft, and said vaned wall being an integral part of said drum.

8. A sterilizer in accordance with claim 1, further comprising at least one air line, a sterilization filter and an air supply blower, and wherein said outer container has an air outlet opening, said outer container being connected via said at least one air line and said sterilization filter with said air supply blower.

9. A sterilizer in accordance with claim 8, further comprising a suction blower, said air outlet opening being arranged in the middle of the upper side of said outer container and being connected with said suction blower.

10. A sterilizer for obtaining rubber parts for pharmaceutical purposes and the like, which rubber parts are free of fretted portions thereof comprising, in combination:
    a. a sterilizing drum for receiving the rubber parts, said drum having a perforated circumferential wall and a charging door;
    b. a closable outer container, said outer container being provided with opening means for charging and emptying same, said outer container being adapted to resist pressure differential which may exist between its outer and inner surfaces during operation and said drum being arranged in said outer container;
    c. a shaft which passes through a passage out of said outer container, said drum being mounted on said shaft for rotary movement by said shaft and said passage being adapted to resist pressure differential which may exist between its outer and inner surfaces during operation;
    d. a drive unit, said drive unit being connected to said shaft for rotary driving of said shaft;
    e. operational means for affecting speed of said drive unit to provide at least one speed of rotation which is sufficiently high that rubber parts within said sterilizing drum may be held by centrifugal force against said inner wall of said drum;
    f. a liquid supply line and an outlet line, said supply line and said outlet line being in communication with said outer container; and
    g. means for introducing pressurized steam into said drum.

11. A sterilizer in accordance with claim 10, including a perforated wall radial to a shaft, said perforated wall being inward of a vaned wall on said shaft, and said vaned wall being an integral part of said drum.

12. In a method of providing a plurality of sterilized, small, delicate, form-stable articles, particularly rubber pieces for the pharmaceutical industry and the like, which pieces are free of fretted portions, in which method the articles are placed into a drum which is rotatably positioned in a closable outer container, the drum being connected with a drive assembly, a washing fluid is introduced into the outer container, the articles are washed and rinsed at least once, with renovation of the washing fluid in the optionally slowly rotating drum, and finally the articles are dried upon evacuation of the washing fluid and introduction of warm air into the outer container, the improvement comprising sterilizing the washed articles by hot steam introduced into the housing before the drying step, the drum being rapidly rotated during the sterilization step at such a speed that the articles are held against the inner wall of the drum by centrifugal force, and raising, as a part of the drying step, the r.p.m. of the drum subsequent to evacuation of the washing fluid to such an extent that the articles are distributed and held against the inner wall of the drum by centrifugal force, and maintaining the r.p.m. of the drum causing the holding of the articles until the end of the drying step.

13. A method according to claim 12, wherein the r.p.m. holding the articles on the inner wall of the drum is continuously maintained from the beginning of sterilization step to the end of the drying step.

* * * * *